(12) United States Patent
Chang et al.

(10) Patent No.: US 9,088,449 B1
(45) Date of Patent: Jul. 21, 2015

(54) ADAPTIVE SWITCHED-CAPACITOR EQUALIZER

(71) Applicants: NCKU Research and Development Foundation, Tainan (TW); Himax Technologies Limited, Tainan (TW)

(72) Inventors: Soon-Jyh Chang, Tainan (TW); Yen-Long Lee, Tainan (TW); Chung-Ming Huang, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 0 days.

(21) Appl. No.: 14/182,200

(22) Filed: Feb. 17, 2014

(51) Int. Cl.
*H03H 7/30* (2006.01)
*H04L 25/03* (2006.01)

(52) U.S. Cl.
CPC . *H04L 25/03878* (2013.01); *H04L 2025/03535* (2013.01)

(58) Field of Classification Search
CPC ............... H03H 19/004; H04B 3/145; H04L 25/03057; H04L 25/03878; H04L 25/03885; H04L 25/03019

USPC ......................................... 375/229, 230, 232
See application file for complete search history.

(56) References Cited

U.S. PATENT DOCUMENTS

| | | | |
|---|---|---|---|
| 4,453,143 A * | 6/1984 | Bennett ........................ | 333/28 R |
| 4,459,698 A * | 7/1984 | Yumoto et al. ................ | 375/236 |
| 4,494,082 A * | 1/1985 | Bennett ........................ | 333/28 R |
| 4,833,691 A * | 5/1989 | Takatori et al. ................ | 375/233 |
| 2010/0085225 A1* | 4/2010 | Chang et al. .................. | 341/110 |
| 2011/0299585 A1* | 12/2011 | Tomita et al. ................. | 375/236 |

\* cited by examiner

*Primary Examiner* — Kenneth Lam
(74) *Attorney, Agent, or Firm* — Donald E. Stout; Stout, Uxa & Buyan, LLP

(57) ABSTRACT

An adaptive switched-capacitor equalizer includes a first variable capacitor that is switchably connected between an input voltage and an output voltage, and a second variable capacitor that is switchably connected between the input voltage and the output voltage. The equalizer operates in a sequence of three phases, in a first phase of which the first variable is reset; in a second phase of which the first variable capacitor and the second variable capacitor are electrically connected in parallel between the input voltage and the output voltage; in a third phase of which calibration is performed according to the input voltages received in sequence.

14 Claims, 4 Drawing Sheets

ADAPTIVE SWITCHED-CAPACITOR EQUALIZER

BACKGROUND OF THE INVENTION

1. Field of the Invention

The present invention generally relates to an equalizer, and more particularly to a quarter-rate adaptive charge-average switched-capacitor equalizer.

2. Description of Related Art

An equalizer is an essential building block adopted in digital communications for the purpose of reducing intersymbol interference (ISI) while recovering transmit symbols. A conventional equalizer includes, among others, a current-mode logic (CML) adder, which nevertheless consumes considerable power. Due to poor performance of a linear equalizer, a decision feedback equalizer, a nonlinear equalizer, has been used to replace the linear equalizer. However, the decision feedback mechanism adopted in the decision feedback equalizer is complex in nature and thus limits the operating speed of an equalizer, particularly in complementary metal-oxide-semiconductor (CMOS) design.

For the foregoing reasons, a need has thus arisen to propose a novel equalizer to overcome the disadvantages of conventional equalizers.

SUMMARY OF THE INVENTION

In view of the foregoing, it is an object of the embodiment of the present invention to provide an adaptive charge-average switched-capacitor equalizer that operates at quarter-rate of an input data with reduced power consumption and enhanced operating speed.

According to one embodiment, an adaptive switched-capacitor equalizer includes a first variable capacitor and a second variable capacitor. The first variable capacitor is switchably connected between an input voltage and an output voltage, and the second variable capacitor is switchably connected between the input voltage and the output voltage. The equalizer operates in a sequence of three phases, in a first phase of which the first variable is reset; in a second phase of which the first variable capacitor and the second variable capacitor are electrically connected in parallel between the input voltage and the output voltage; in a third phase of which calibration is performed according to the input voltages received in sequence.

DETAILED DESCRIPTION OF THE INVENTION

Figure 1:
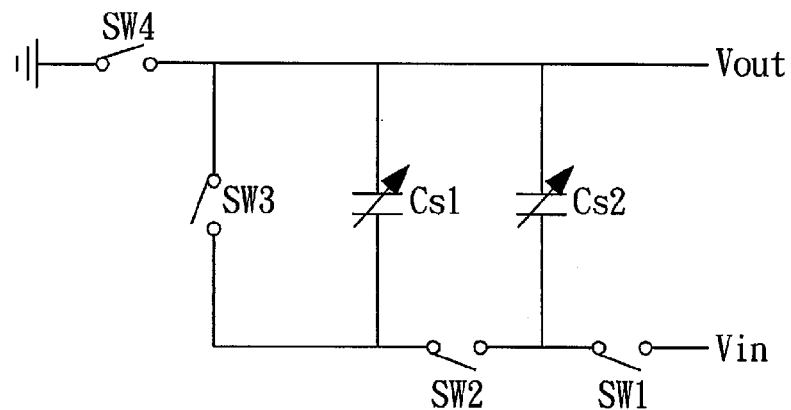
FIG. 1 schematically shows a circuit illustrating an adaptive charge-average switched-capacitor equalizer according to one embodiment of the present invention.

FIG. 1 schematically shows a circuit illustrating an adaptive charge-average switched-capacitor equalizer 100 according to one embodiment of the present invention. In the embodiment, the equalizer 100 may include a first variable capacitor Cs1 that is switchably connected between an input voltage Vin and an output voltage Vout, for example, via a first switch SW1 and a second switch SW2. The equalizer 100 may also include a second variable capacitor Cs2 that is switchably connected between the input voltage Vin and the output voltage Vout, for example, via the first switch SW1. The equalizer 100 may further include a third switch SW3 with two ends respectively connected to two ends of the first variable capacitor Cs1; and a fourth switch SW4 connected between the output voltage Vout and a ground. Therefore, the first variable capacitor Cs1, the second variable capacitor Cs2 and the switches SW1-4 constitute a switched-capacitor equalizer 100.

Figure 2:
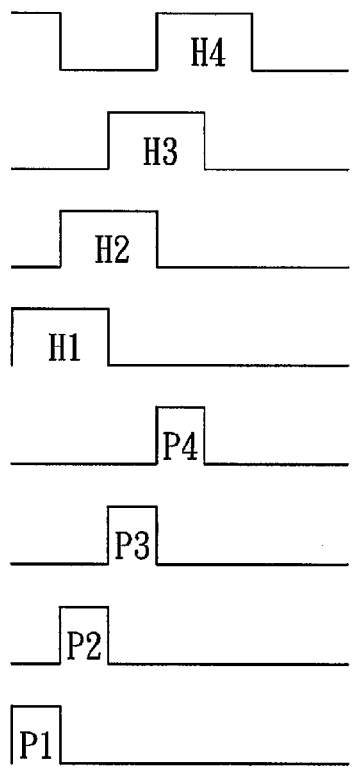
FIG. 2 shows an exemplary timing diagram for the equalizer of FIG. 1 operated in a sequence of phases.

In the embodiment, as shown in an exemplary timing diagram of FIG. 2, the equalizer 100 may operate in a sequence of three phases P1 to P3, each having a time period that is substantially equal to a quarter of a cycle of an input voltage Vin, therefore constituting a quarter-rate equalizer 100.

Figure 3A:
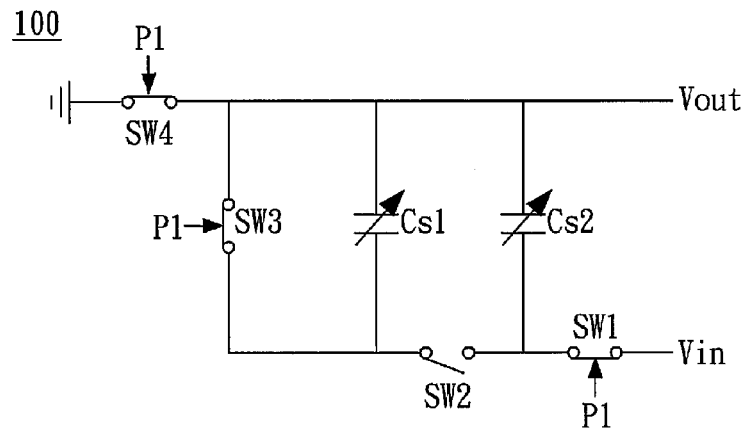
FIG. 3A to FIG. 3C show switching states of the equalizer of FIG. 1 operated in a sequence of three phases, respectively.
Figure 3B:
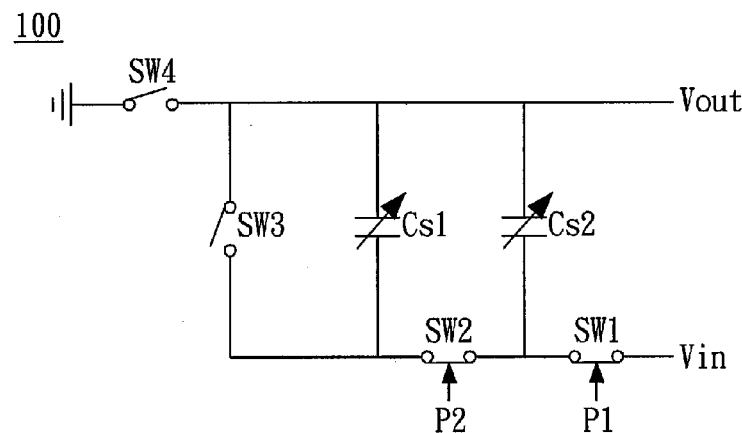
Figure 3C:
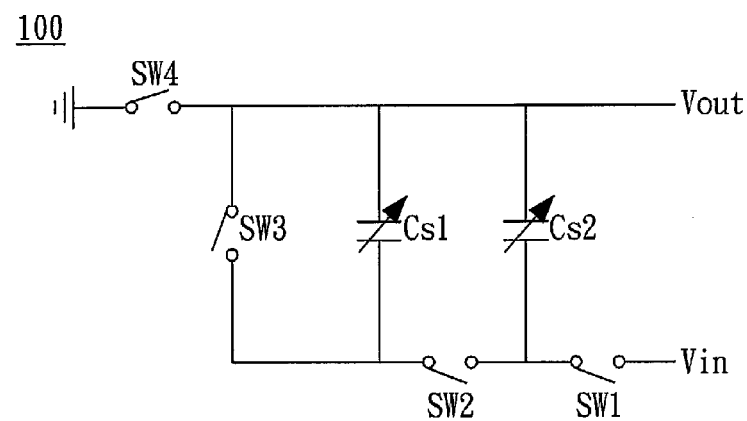

FIG. 3A to FIG. 3C show switching states of the equalizer 100 operated in a sequence of the phases P1 to P3, respectively. Specifically speaking, in a first phase or a reset phase as demonstrated in FIG. 3A, the first variable capacitor Cs1 is electrically shorted by closing the third switch SW3, and the output voltage Vout is electrically connected to the ground by closing the fourth switch SW4. During a period H1 which partially overlaps with the first phase P1 (and partially overlaps with the second phase P2), the second variable capacitor Cs2 is electrically connected between the input voltage Vin and the output voltage Vout by closing the first switch SW1. It is noted that the second switch SW2 is open in this phase P1.

In a second phase or an evaluation phase as demonstrated in FIG. 3B, the first variable capacitor Cs1 and the second variable capacitor Cs2 are electrically connected in parallel between the input voltage Vin and the output voltage Vout, by closing the second switch SW2 and keeping the first switch SW1 closed. At the end of this phase P2, due to charge averaging adopting double sampling with dynamic offset modulation technique, the output voltage Vout may be expressed as follows:

$$Vout = \frac{Cs1}{Cs1+Cs2} Vin[n] + \frac{Cs2}{Cs1+Cs2} \Delta Vin[n] = \alpha \cdot Vin[n] + (1-\alpha) \Delta Vin[n]$$

where $\alpha = Cs1/(Cs1+Cs2)$, $\Delta Vin[n] = Vin[n] - Vin[n-1]$, $Vin[n]$ is an input voltage at time n, and $Vin[n-1]$ is an input voltage at time (n-1).

Figure 4:
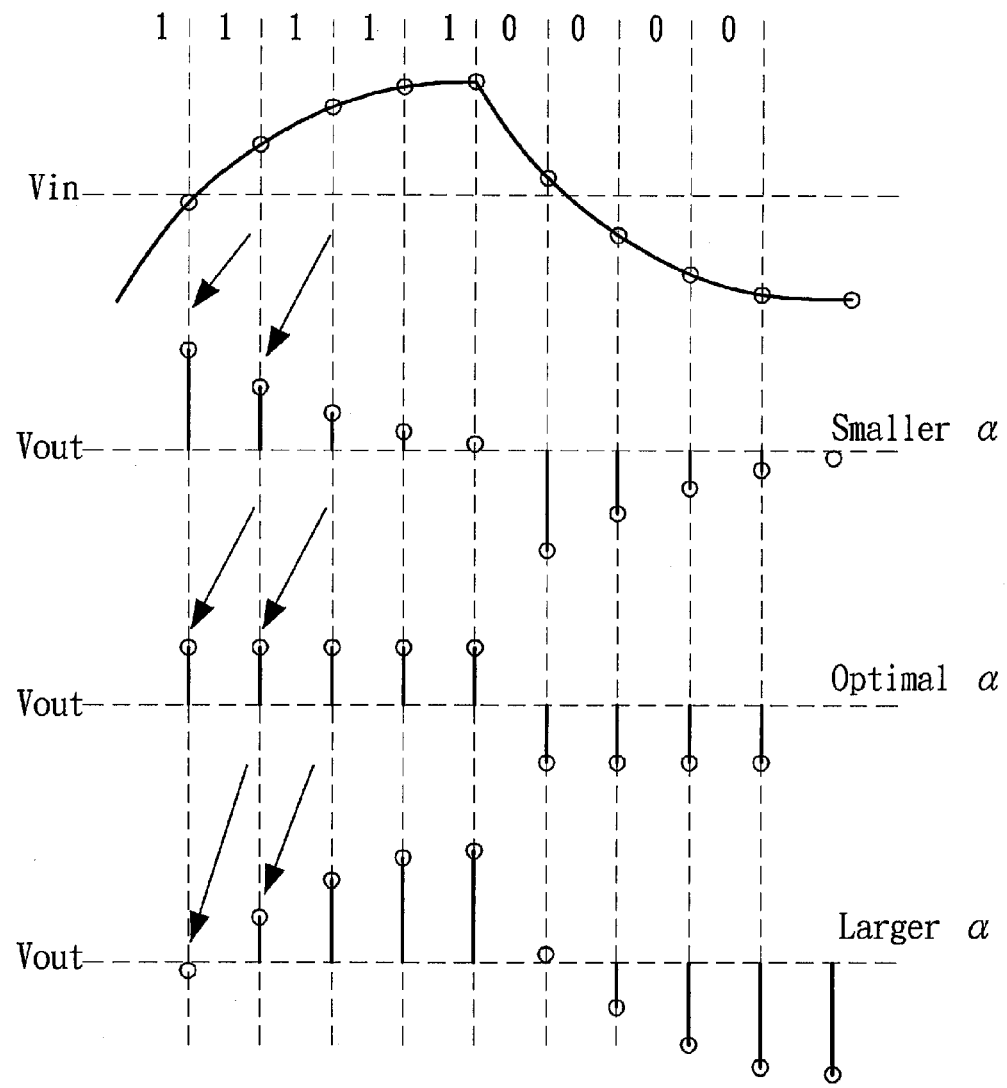
FIG. 4 shows examples of calibration performed by the equalizer of FIG. 1.

In a third phase or a calibration phase as demonstrated in FIG. 3C, all switches SW1-SW4 are open. In this phase P3, a calibration process may be performed as exemplified in FIG. 4, in which severe situations are examined. Specifically, when two bits received in sequence are the same (e.g., two "1" or two "0") and the latter one has a smaller (absolute) amplitude in the output voltage Vout (as designated as "smaller a" in FIG. 4), a capacitance of the first variable capacitor Cs1 need be increased such that the amplitudes of the output voltages sampled in sequence may become substantially equal (as designated as "optimal a" in FIG. 4), thereby facilitating equalization in the equalizer 100. On the other hand, when two bits received in sequence are the same (e.g., two "1" or two "0") and the latter one has a larger (absolute) amplitude in the output voltage Vout (as designated as "larger a" in FIG. 4), a capacitance of the first variable capacitor Cs1 need be decreased such that the amplitudes of the output voltages sampled in sequence may become substantially equal (as designated as "optimal α" in FIG. 4), thereby facilitating equalization in the equalizer 100.

Figure 5:
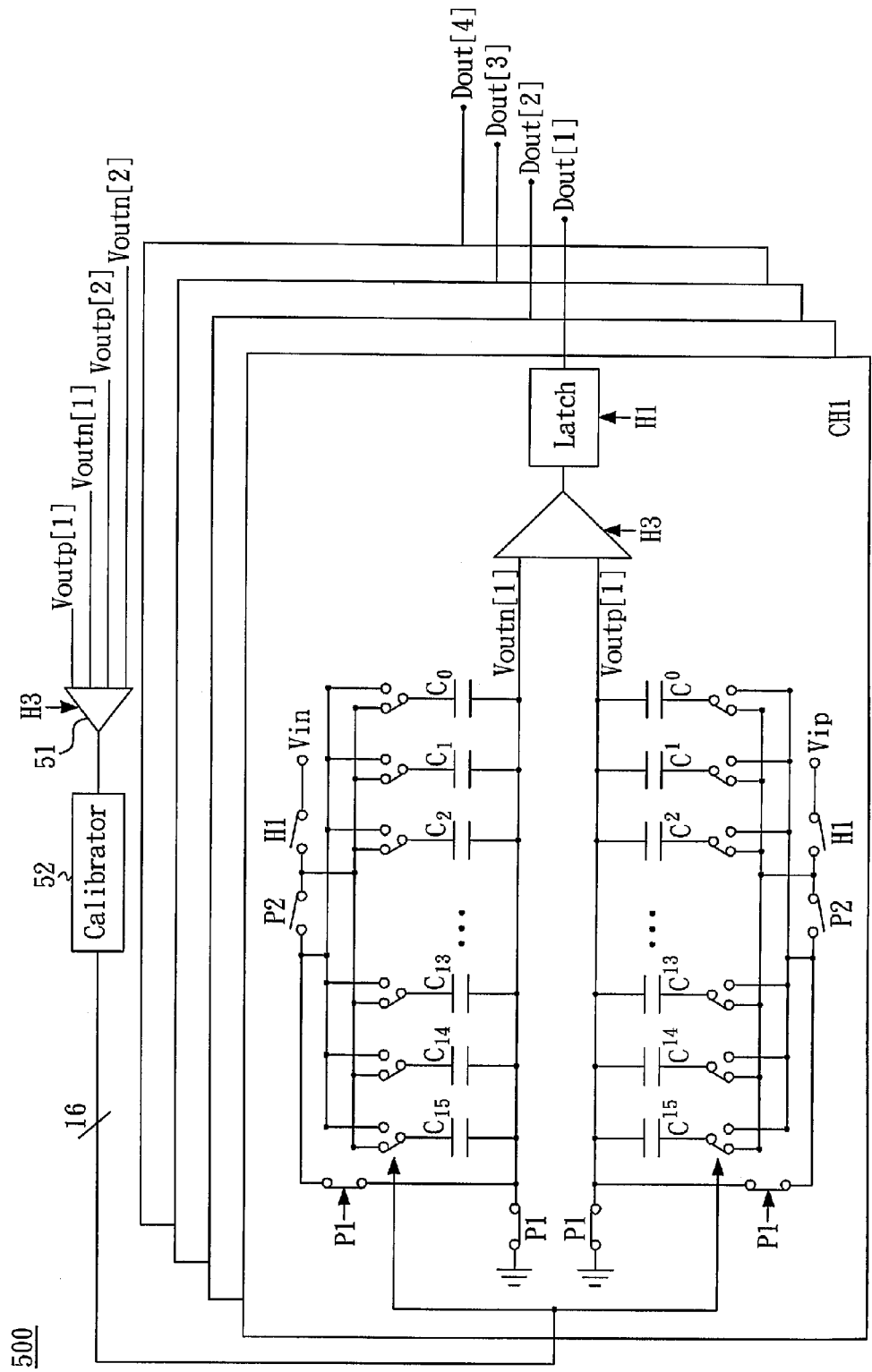
FIG. 5 shows a detailed circuit implementing an equalizer according to one embodiment of the present invention.

FIG. 5 shows a detailed circuit implementing an equalizer 500 according to one embodiment of the present invention. A differential signaling scheme is adopted, in which complementary signals (e.g., Vip/Vin or Voutp/Voutn) are used.

In the embodiment, an array of capacitors C0 to C15 are switchably connected between an input voltage (e.g., Vin or Vip) and an output voltage (e.g., Voutn or Voutp). Specifically, in the embodiment, first ends of the capacitors C0-C15 are jointed together and connected to the output voltage Voutn/Voutp. Second ends of the capacitors C0-C15 are switchably configured into two groups, each having one capacitor or plural capacitors that are connected in parallel, thereby constituting a first/second variable capacitor Cs1/Cs2 (FIG. 1). The switching of the capacitors C0-C15 may be executed according to calibration as described above associated with FIG. 4, in order to increase or decrease a capacitance of the first variable capacitor Cs1 (or a capacitance of the second variable capacitor Cs2). In FIG. 5, a comparator 51 is utilized to compare amplitudes of two output voltage Vout sampled in sequence, and a calibrator 52 is configured to perform the calibration described above.

Although specific embodiments have been illustrated and described, it will be appreciated by those skilled in the art that various modifications may be made without departing from the scope of the present invention, which is intended to be limited solely by the appended claims.

What is claimed is:

1. An adaptive switched-capacitor equalizer, comprising:
   a first variable capacitor that is switchably connected between an input voltage and an output voltage;
   a second variable capacitor that is switchably connected between the input voltage and the output voltage; and
   a third switch with two ends respectively connected to two ends of the first variable capacitor;
   wherein the equalizer operates in a sequence of three phases, in a first phase of which the first variable is reset; in a second phase of which the first variable capacitor and the second variable capacitor are electrically connected in parallel between the input voltage and the output voltage; in a third phase of which calibration is performed according to the input voltages received in sequence.

2. The equalizer of claim 1, wherein each of the three phases has a time period that is substantially equal to a quarter of a cycle of the input voltage.

3. The equalizer of claim 1, wherein the second variable capacitor is switchably connected between the input voltage and the output voltage via a first switch.

4. The equalizer of claim 3, wherein the first variable capacitor is switchably connected between the input voltage and the output voltage via the first switch and a second switch.

5. The equalizer of claim 1, further comprising a fourth switch connected between the output voltage and a ground.

6. The equalizer of claim 5, in the first phase of which the first variable capacitor is electrically shorted by closing the third switch, and the output voltage is electrically connected to the ground by closing the fourth switch, and the second variable capacitor is electrically connected between the input voltage and the output voltage by closing the first switch, while the second switch is open.

7. The equalizer of claim 5, in the second phase of which the first switch and the second switch are close, while the third switch and the fourth switch are open.

8. The equalizer of claim 7, in the second phase of which the output voltage Vout is expressed as follows:

$$Vout = \frac{Cs1}{Cs1+Cs2}Vin[n] + \frac{Cs2}{Cs1+Cs2}\Delta Vin[n] = \alpha \cdot Vin[n] + (1-\alpha)\Delta Vin[n]$$

where Vin represents the input voltage, Cs1 and Cs2 represent capacitances of the first variable capacitor and the second variable capacitor respectively, $\alpha = Cs1/(Cs1+Cs2)$, $\Delta Vin[n] = Vin[n] - Vin[n-1]$, $Vin[n]$ is an input voltage at time n, and $Vin[n-1]$ is an input voltage at time $(n-1)$.

9. The equalizer of claim 5, in the third phase of which the first switch, the second switch, the third switch and the fourth switch are open.

10. The equalizer of claim 1, in the third phase of which a capacitance of the first variable capacitor is increased when two bits received in sequence are the same and the latter one has a smaller amplitude in the output voltage.

11. The equalizer of claim 1, in the third phase of which a capacitance of the first variable capacitor is decreased when two bits received in sequence are the same and the latter one has a larger amplitude in the output voltage.

12. The equalizer of claim 1, wherein the first variable capacitor and the second variable capacitor comprise an array of capacitors that are switchably connected between the input voltage and the output voltage, wherein first ends of the capacitors are jointed together and connected to the output voltage, second ends of the capacitors are switchably configured into two groups, each having one capacitor or plural capacitors that are connected in parallel, thereby constituting the first or the second variable capacitor.

13. An adaptive switched-capacitor equalizer, comprising:
   a first variable capacitor that is switchably connected between an input voltage and an output voltage; and
   a second variable capacitor that is switchably connected between the input voltage and the output voltage;
   wherein the equalizer operates in a sequence of three phases, in a first phase of which the first variable is reset; in a second phase of which the first variable capacitor and the second variable capacitor are electrically connected in parallel between the input voltage and the output voltage; in a third phase of which calibration is performed according to the input voltages received in sequence; further comprising a comparator configured to compare amplitudes of two output voltage sampled in sequence in the third phase.

14. An adaptive switched-capacitor equalizer, comprising:
   a first variable capacitor that is switchably connected between an input voltage and an output voltage; and
   a second variable capacitor that is switchably connected between the input voltage and the output voltage;
   wherein the equalizer operates in a sequence of three phases, in a first phase of which the first variable is reset; in a second phase of which the first variable capacitor and the second variable capacitor are electrically connected in parallel between the input voltage and the output voltage; in a third phase of which calibration is performed according to the input voltages received in sequence; further comprising a calibrator configured to perform the calibration in the third phase.

* * * * *